(12) United States Patent
Liao et al.

(10) Patent No.: US 9,348,374 B2
(45) Date of Patent: May 24, 2016

(54) HARD DISK MOUNTING MECHANISM

(71) Applicant: HON HAI PRECISION INDUSTRY CO., LTD., New Taipei (TW)

(72) Inventors: Feng-Liang Liao, New Taipei (TW); Tzu-Hsiu Hung, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 71 days.

(21) Appl. No.: 14/479,043

(22) Filed: Sep. 5, 2014

(65) Prior Publication Data

US 2015/0241933 A1 Aug. 27, 2015

(30) Foreign Application Priority Data

Feb. 24, 2014 (TW) .............................. 103106151 A

(51) Int. Cl.
| | |
|---|---|
| *G06F 1/16* | (2006.01) |
| *G06F 1/18* | (2006.01) |
| *G11B 33/12* | (2006.01) |
| *G11B 33/14* | (2006.01) |

(52) U.S. Cl.
CPC .............. *G06F 1/187* (2013.01); *G11B 33/124* (2013.01); *G11B 33/1426* (2013.01)

(58) Field of Classification Search
USPC ........... 320/112; 361/679.06, 679.09, 679.01, 361/679.02, 679.22, 679.27, 679.3, 679.55, 361/679.21, 679.07, 679.26, 679.41, 679.2; 455/412, 566, 575.1, 575.3, 412.1, 455/67.7, 573, 557, 52.1; 349/58, 59, 64, 349/65; 248/70, 351, 206.4, 301, 541, 248/311.2, 293.1, 237, 319.2, 231.1, 231.2, 248/245; 345/698, 102, 600, 660, 211, 99, 345/100, 690, 179
See application file for complete search history.

(56) References Cited

U.S. PATENT DOCUMENTS

| | | | | |
|---|---|---|---|---|
| 2001/0055197 | A1* | 12/2001 | Agata | .................... G06F 1/1616 361/679.05 |
| 2009/0284222 | A1* | 11/2009 | Tamura | .................... G06F 1/263 320/112 |
| 2009/0296344 | A1 | 12/2009 | Tu | |
| 2015/0124389 | A1* | 5/2015 | Okuley | ................. G06F 1/1616 361/679.09 |

FOREIGN PATENT DOCUMENTS

| | | |
|---|---|---|
| CN | 200820005445.9 | 1/2009 |
| TW | 535968 | 6/2003 |
| TW | 200616525 | 5/2006 |
| TW | 201044384 A1 | 12/2010 |
| TW | M455242 U1 | 6/2013 |

\* cited by examiner

*Primary Examiner* — Hung Duong
(74) *Attorney, Agent, or Firm* — Novak Druce Connolly Bove + Quigg LLP

(57) ABSTRACT

A hard disk mounting mechanism can be used for assembling a hard disk into a housing defining an opening. The hard disk can be inserted into the housing via the opening. The hard disk mounting mechanism can include a mounting bracket and a slidable carrier. The mounting bracket can include a cover and a slidable carrier. The cover can be rotatably connected to the housing for covering the opening. The slidable carrier can be located in the housing adjacent to the opening, and has a first surface facing the opening. A first heat conductive pad can be arranged on the first surface of the slidable carrier. The hard disk can be assembled on the slidable carrier. The hard disk can contact with the first heat conductive pad from the opening when the cover is rotated to cover the opening.

20 Claims, 10 Drawing Sheets

HARD DISK MOUNTING MECHANISM

FIELD

The present disclosure relates to mounting devices, and more particularly to a hard disk mounting mechanism.

BACKGROUND

Hard disks that are applied to outdoor equipment work at a high temperature. In order to prevent the hard disk from being effected by the high temperature, a heat conductive pad can be located in a receiving space in which the hard disk is received, and can make contact with the hard disk. But when the hard is inserted into the receiving space or taken out from the receiving space, the heat conductive pad is scraped by the hard disk, such that the heat conductive pad is easily damaged.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and reference numerals designate corresponding parts throughout the several views.

DETAILED DESCRIPTION

Figure 1:
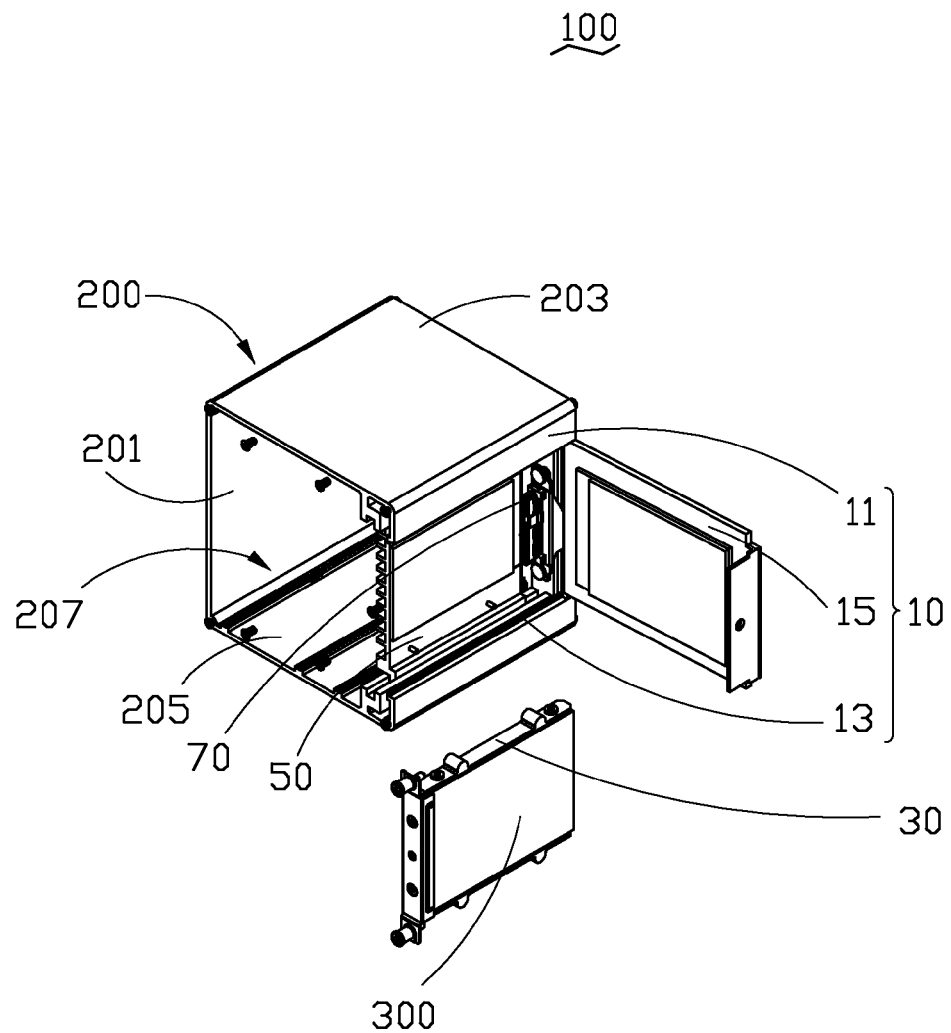
FIG. 1 is an exploded, isometric view of an electronic device with a hard disk mounting mechanism and a housing.

The disclosure is illustrated by way of example and not by way of limitation in the figures of the accompanying drawings in which like reference numerals indicate the same or similar elements. It should be noted that references to "an" or "one" embodiment in this disclosure are not necessarily to the same embodiment, and such references can mean "at least one."

FIG. 1 illustrates an exploded, isometric view of a mounting mechanism 100 in accordance with one embodiment of the present disclosure. The mounting mechanism 100 can be utilized to mount a hard disk 300 to a housing 200 of an electronic device (not shown), for example a computer. The housing 200 can include a backboard 201, a first sidewall 203 and a second sidewall 205, the first sidewall 203 and the second sidewall 205 can be integrally formed with the backboard 201 and can perpendicularly extend from opposite edges of the backboard 201. The backboard 201, the first sidewall 203 and the second sidewall 205 can cooperatively form the housing with an opening 207 (shown in FIG. 8) facing the backboard 201.

The mounting mechanism 100 can include a mounting bracket 10, a clamping mechanism 30, a slidable carrier 50, and an electrical connector assembly 70. The mounting bracket 10 can be located in the housing 200 and can be adjacent to the opening 207. The slidable carrier 50 can be located in the housing 200 and can be adjacent to the opening 207, the slidable carrier 50 can connect the mounting bracket 10. The electrical connector assembly 70 adjacent to the slidable carrier 50 can be fixed to the mounting bracket 10, and the clamping mechanism 30 can be located on the hard disk 300 and can be detachably coupled to the slidable carrier 50.

The mounting bracket 10 can include a first slide rail 11, a second slide rail 13 and a cover 15. The first slide rail 11 and the second slide rail 13 can be respectively arranged on opposite surfaces of the first sidewall 203 and second sidewall 205, and can face each other. The first slide rail 11 and the second slide rail 13 have a first set of ends 111, 131 and a second set of ends 113, 133 opposite to the first set of ends 111, 131 (shown in FIGS. 8 and 9). The slidable carrier 50 can slide between the first slide rail 11 and the second slide rail 13. The cover 15 can rotatably connect the first slide rail 11 and the second slide rail 13. When the cover 15 is open, the hard disk 300 can be coupled to or disassemble from the slidable carrier 50 from the opening 207. When the cover 15 is closed, the cover 15 can shield the hard disk 300 and can act as a sidewall of the housing 200.

Figure 2:
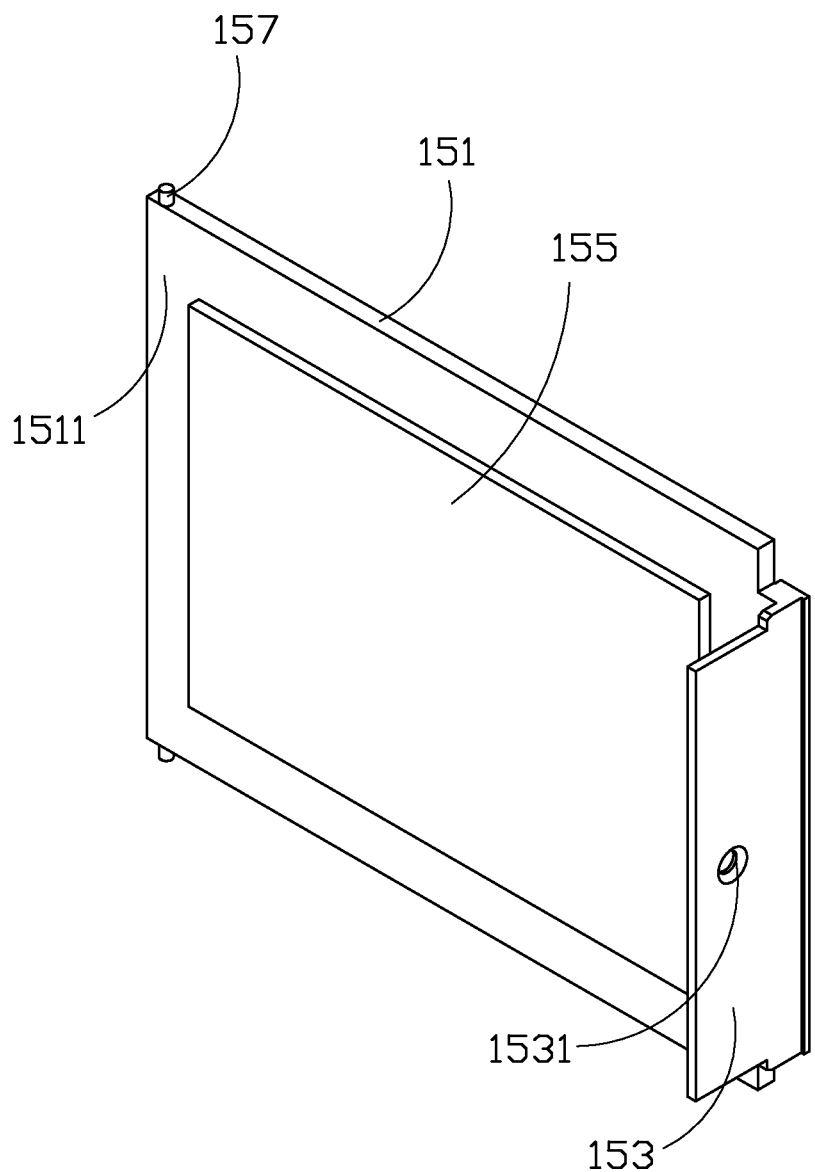
FIG. 2 is an isometric view of a cover of the hard disk mounting mechanism in FIG. 1.
Figure 3:
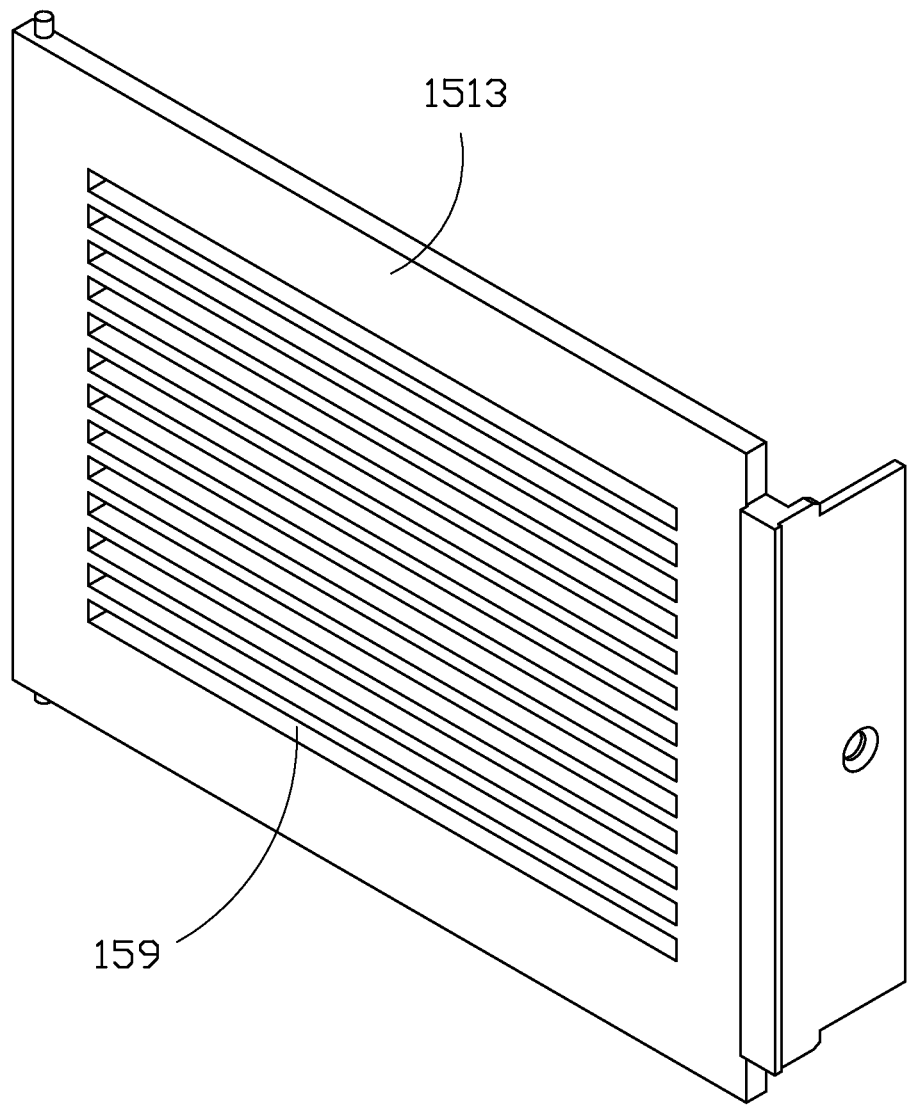
FIG. 3 is an inverted view of the cover in FIG. 2.

FIG. 2 and FIG. 3 illustrate that the cover 15 can include a cover body 151 and a shielding plate 153. In the illustrated embodiment, the shielding plate 153 can extend approximately perpendicularly from an edge of the cover body 151. The cover body 151 can include an inner surface 1511, and an outer surface 1513 opposite to the first surface 1511. When the cover 15 is closed, the inner surface 1511 can face backboard 201. A second heat conductive pad 155 can be arranged on the inner surface 1511, and a plurality of slots 159 can be defined in the outer surface 1513 for heat dissipation. In the embodiment, a pair of shaft holes (not shown) can be respectively defined in the first slide rail 11 and the second slide rail 13 and can be adjacent to the first ends 111, 131. A pair of rotation shafts 157 corresponding to the shaft holes can be arranged on the cover body 151, the cover 15 rotatably connects the first slide rail 11 and the second slide rail 13 by the engagement of the rotation shafts 157 and the shaft holes, so the cover 15 can pivot relative to the rotation shafts 157. A coupling protrusion 1531 can extend from a surface of the shielding plate 153.

Figure 4:
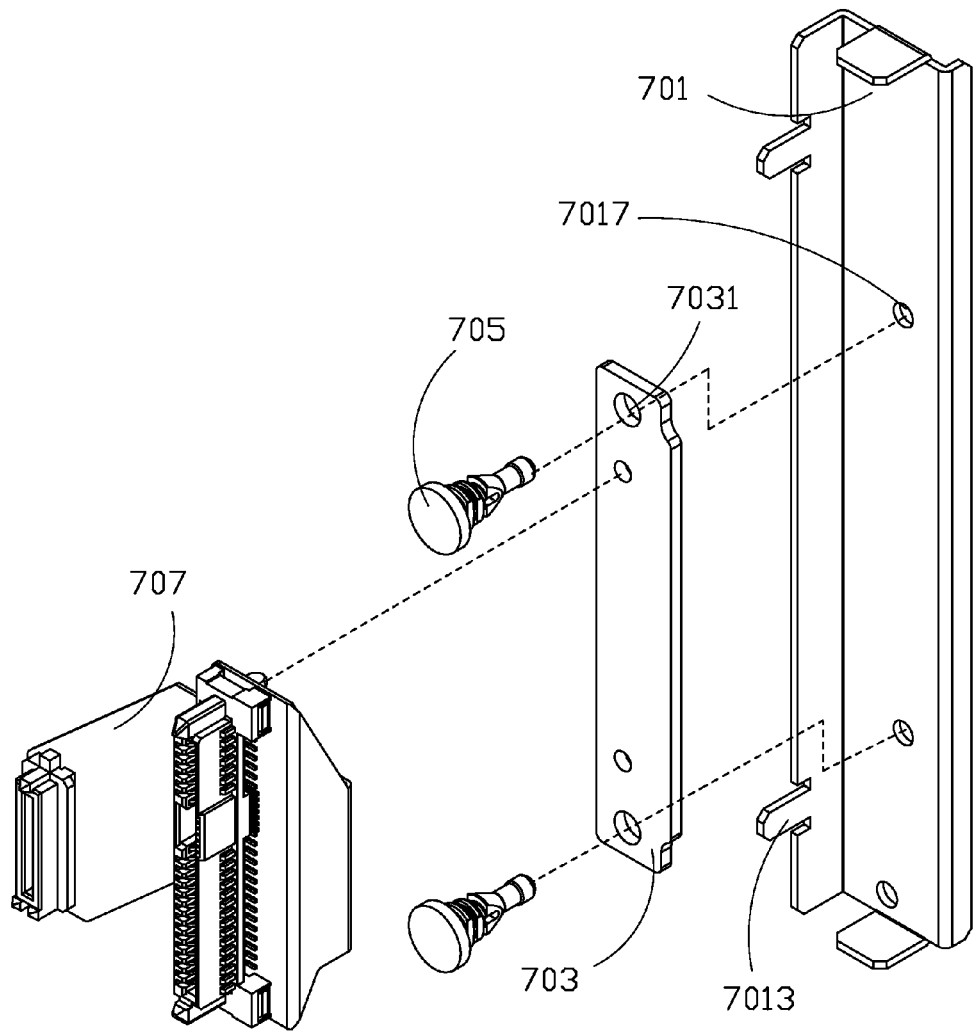
FIG. 4 is an exploded, isometric view of an electrical connector assembly of the hard disk mounting mechanism in FIG. 1.
Figure 5:
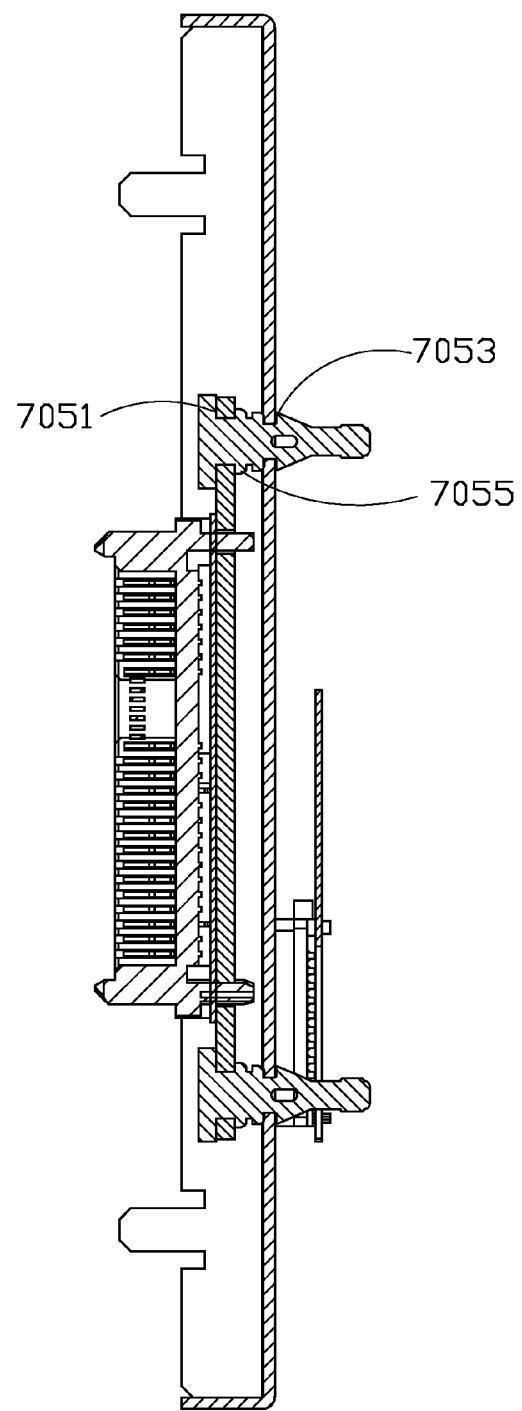
FIG. 5 is a cross-sectional view of the electrical connector assembly in FIG. 4.

FIG. 4 and FIG. 5 illustrate the electrical connector assembly 70. The electrical connector assembly 70 can include a mounting base 701, an enhancing plate 703, an electrical connector 707, and a plurality of buffer pins 705. The mounting base 701 can be defined in through holes 7017 and can comprise guiding posts 7013. The electrical connector 707 can be a fixable flat circuit (FFC) connector 707, which can establish electrical connections between the hard disk 300 and other electronic components. The enhancing plate 703 can support the FFC connector 707 allowing the hard disk 300 to be electrically connected and can be physically inserted into the FFC connector 707 easily. A plurality of through holes 7031 can be respectively defined in the two opposite ends of the enhancing plate 703. The buffer pin 705 can be made of rubber material, a first ring-slot 7051 and a second ring-slot 7053 can be arranged on an outer surface of the buffer pin 705, and a first flange 7055 can be arranged on outer surface of the buffer pin 705 and can be between the first ring-slot 7051 and the second ring-slot 7053.

The mounting base 701 can be fixed to the first ends 111, 131 by screws, the FFC connector 707 can be bonded to the enhancing plate 703 by a glue. The enhancing plate 703 with the FFC electrical connector 707 can be assembled onto mounting base 701 by an engagement of the buffer pin 705 and the through holes 7031, the enhancing plate 703 can be coupled to the first ring-slot 7051 and the mounting base 701 can be coupled to the second ring-slot 7053.

Because the enhancing plate 703 and the mounting base 701 can be spaced apart by the first flange 7055, the structure described above can minimize the transmission of shock and vibrations coming from the housing 200.

Figure 6:
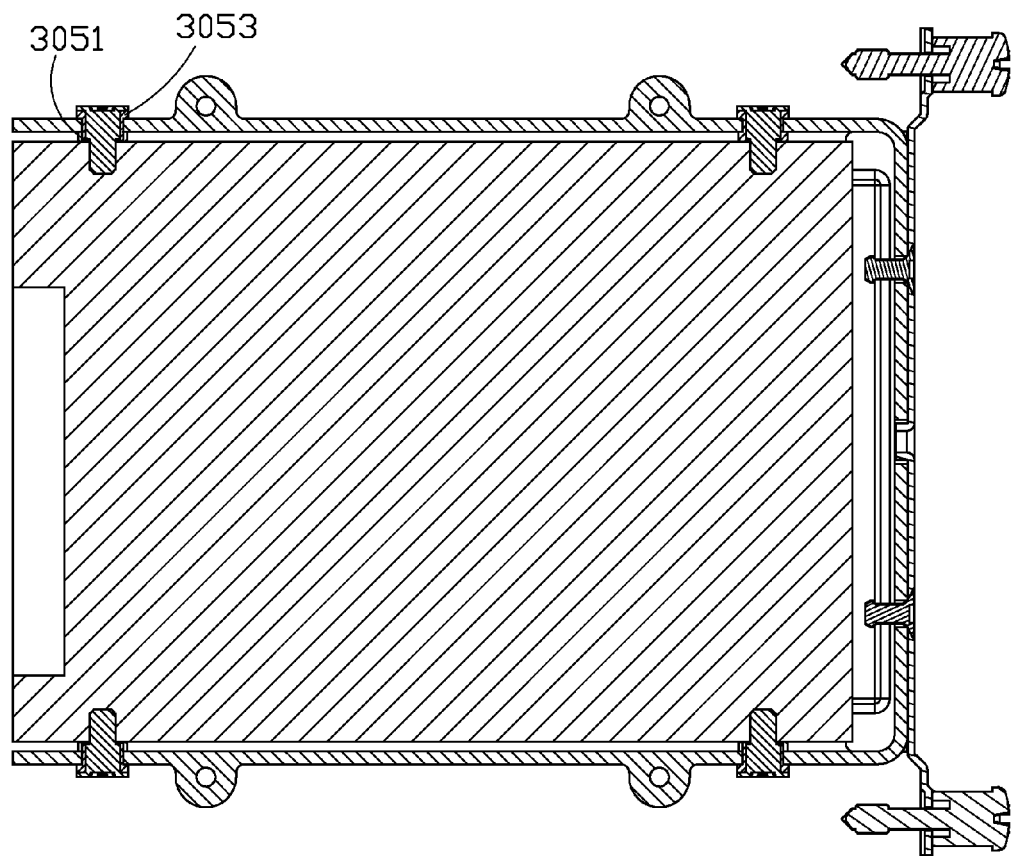
FIG. 6 is an assembled view of a clamping mechanism and a hard disk of the hard disk mounting mechanism in FIG. 1.
Figure 7:
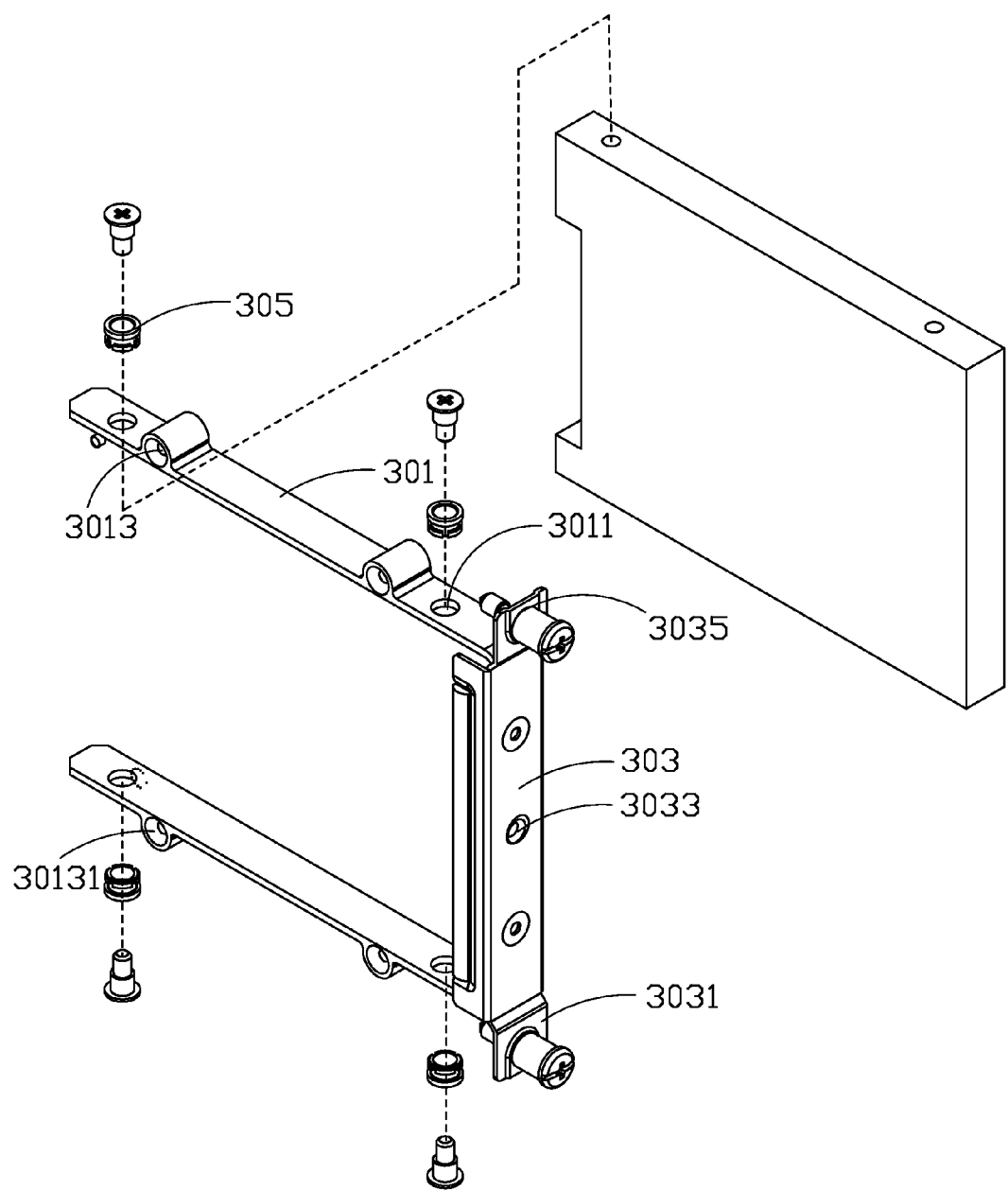
FIG. 7 is an exploded, isometric view of FIG. 6.

FIG. 6 and FIG. 7 illustrate that the clamping mechanism 30 can clamp the hard disk 300 and can be coupled to the slidable carrier 50. The clamping mechanism 30 can be an L-shape, which can include a pair of clip arms 301 of elastomeric material, and a clip base 303 of elastomeric material. The clip arms 301 can extend approximately perpendicular from opposite sides of the clip base 303, and the clip arms 301 can be parallel with each other. The clip base 303 and the clip arms 301 cooperatively form a receiving space 207 for receiving the hard disk 300.

Each clip arm 301 can define at least one through hole 3011 and at least one mounting hole 3013. The hard disk can define at least one screw hole corresponding to the through hole 3011 intended for mounting screws, and the through hole 3011 can align with the corresponding screw hole. Each through hole 3011 can be set within a buffer sleeve 305 of rubber material.

A second flange 3051 of the buffer sleeve 305 can extend outwardly from an outer surface of the buffer sleeve 305 in a vertical direction relative to the buffer sleeve 305 covering the partial surface region of the clip arm 301 away from the hard disk 300. In addition, a third flange 3053 of the buffer sleeve 305 can extend outwardly from an outer surface of the buffer sleeve 305 in a vertical direction relative to the buffer sleeve 305 covering a partial surface region of the clip arm 301 facing the hard disk 300.

Each mounting hole 3013 can be provided with a guiding structure 30131, which can allow the mounting post 55 to be inserted into the mounting hole 3013 with good positional accuracy. In the embodiment, the guiding structure 30131 can be a sloped sidewall.

The hard disk 300 can be preliminarily clamped by the clip arms 301, and then at least one screw can pass through the through hole 3011 and can be screwed into the screw hole, and thereby the hard disk 300 can be fixed in the receiving space 207 of the clamping mechanism 30. Moreover, a head of the screw can only contact the third flange 3053, and the hard disk 300 can only contact the second flange 3051 when the hard disk 300 is fixed into the receiving space 207. The structure described above can achieve an objective of minimizing the transmission of shock and vibrations coming from the clamping mechanism 30.

The clip base 303 can define a coupling hole 3033 corresponding to the coupling protrusion 1531. When the cover 15 is rotated to a closed state, the coupling protrusion 1531 can be coupled to the coupling hole 3033 to prevent the cover 15 from rotating with respect to the housing 200. Each of the two free ends of the clip base 303 can be provided with a tab 3031. Each tab 3031 extends along the clip base 303 and can be approximately perpendicular with the clip arm 301. Each tab 3031 can defines a through hole 3035, and the second ends 113, 133 respectively can define a screw hole corresponding to and aligning with the through hole 3035.

Figure 8:
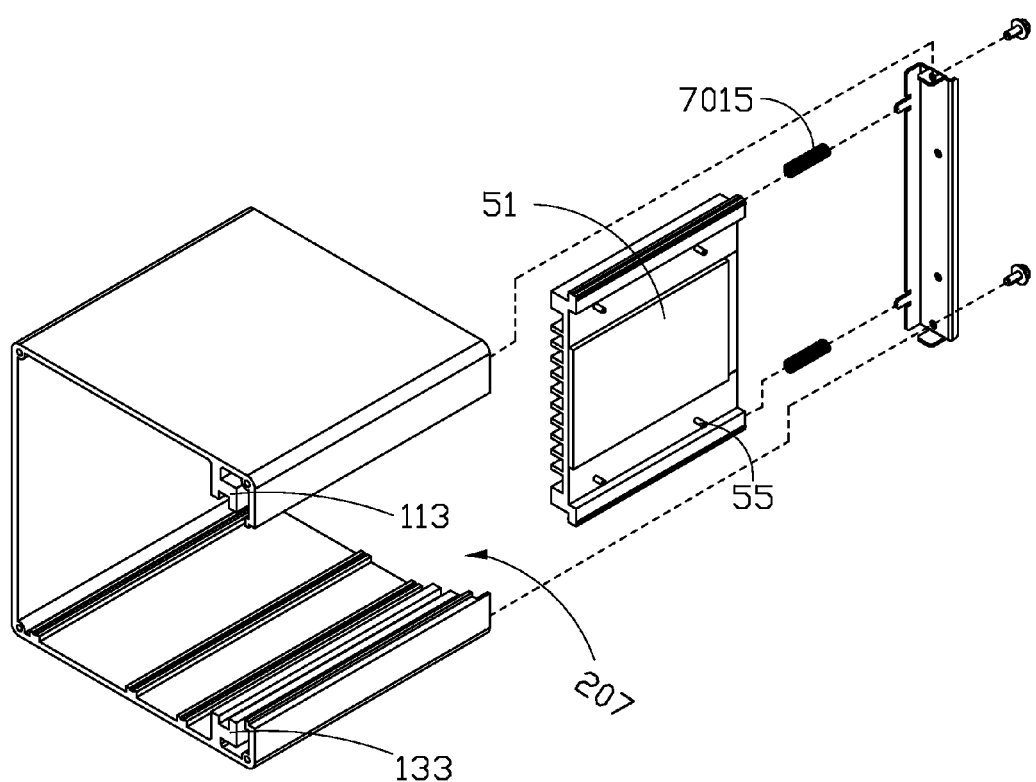
FIG. 8 is an exploded, isometric view of a slidable carrier and a mounting plate of the hard disk mounting mechanism in FIG. 1.
Figure 9:
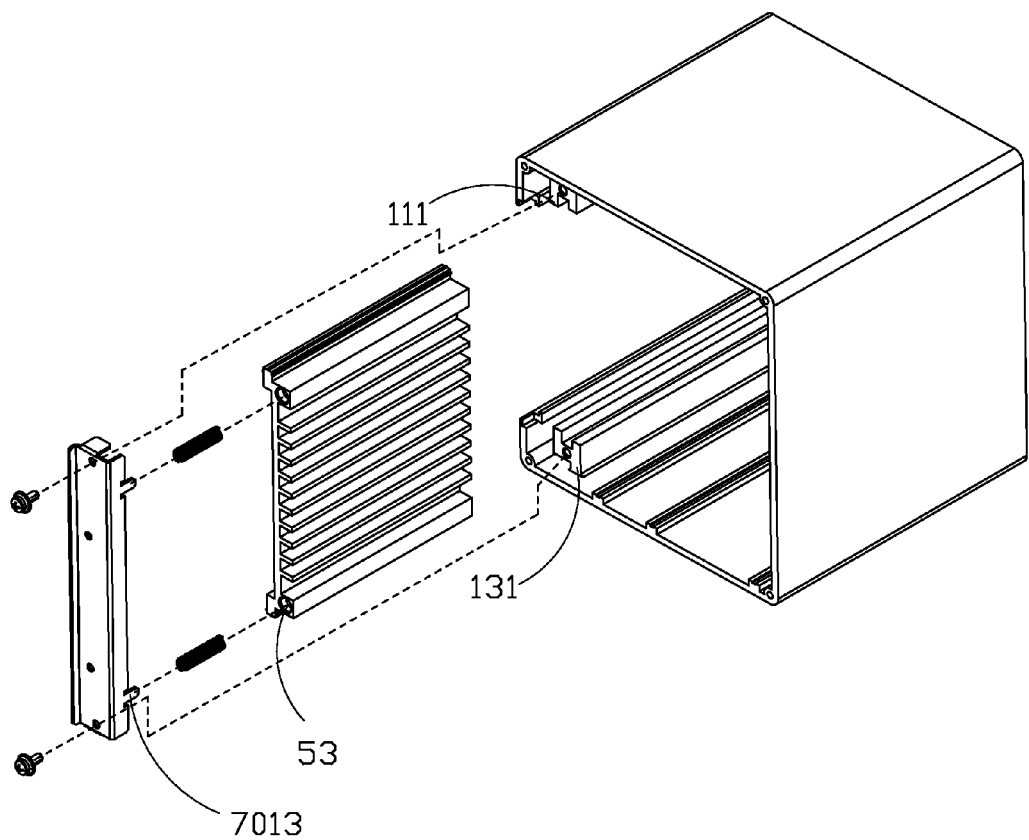
FIG. 9 is an inverted view of the slidable carrier and a mounting plate of the hard disk mounting mechanism in FIG. 8.

FIGS. 8 and 9 illustrate that the slidable carrier 50 can be provided with a first heat conductive pad 51 opposite to the second heat conductive pad 155. A plurality of guiding holes 53 can be defined in the slidable carrier 50 respectively aligning with the plurality of guiding posts 7013. Each guiding post 7013 can be arranged with a spring 7015. When slidable carrier 50 is placed allowing the guiding post 7013 to be inserted into the corresponding guiding hole 53, the spring 7015 stops between an inlet of the guiding hole 53 and the mounting base 701, which urge the slidable carrier 50 away from the electrical connector assembly 70 automatically when the slidable carrier 50 is released. At least one mounting post 55 can be located on the slidable carrier 50, which can engage with the mounting hole 3013 to couple the clamping mechanism 30 to the slidable carrier 50.

Figure 10:
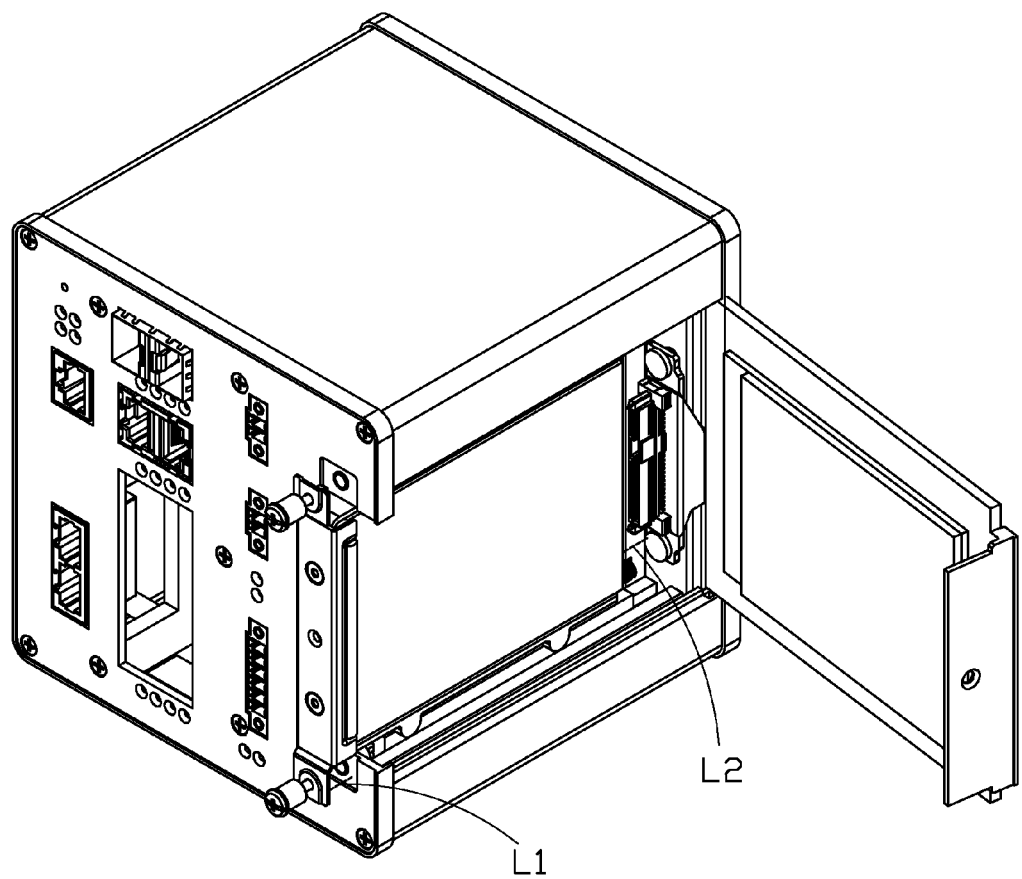
FIG. 10 is an assembled view of the hard disk mounting mechanism and the electronic device housing in FIG. 1

FIG. 10 illustrates that the hard disk 300 can be assembled to the hard disk mounting mechanism 100 in the following manner. The hard disk 300 can be fixed into the clamping mechanism 30 with screws, the clamping mechanism 30 with the hard disk 300 can be coupled to the slidable carrier 50 by the engagement of the mounting post 55 and the mounting hole 3013 from the opening 207, and the hard disk 300 can contact the first heat conductive pad 51 tightly. In this condition, a distance L1 can exist between the tabs 3031 and the second ends 113, 133, a distance L2 can exist between the hard disk 300 and the electrical connector assembly 70, and the distance L1 can equal distance L2. The slidable carrier 50 can be slid toward the electrical connector assembly 70 by pushing the clip base 303, which allows the hard disk 300 to be electrically connected and physically inserted into the electrical connector 707, with the guiding post 7013 inserted into the guiding hole 53 and the spring 7015 stopping between the inlet of the guiding hole 53 and the mounting base 701. In this condition, the tabs 3031 stop on the second ends 113, 133 with the though hole 3035 aligning to the screw hole of the second ends 113, 133, and then screws can be inserted into the through hole 3035 and can be screwed into the screw hole to lock the clamping mechanism 30 to the housing 200. Finally, the cover 15 can be rotated to allow the second heat conductive pad 155 to press on the hard disk 300 and allow the coupling protrusion 1531 to couple with the coupling hole 3033, in order to prevent the cover 15 rotating relative the housing 200.

The hard disk 300 can be disassembled from the hard disk mounting mechanism 100 in the following manner. The cover 15 can be rotated to expose and allow the coupling protrusion 1531 to be removed out from the coupling hole 3033, and then the screw can be screwed out from the screw hole, so the hard disk 300 can be automatically separated from the electrical connector 707 by the urging of the spring 7015.

With the structure described above, the hard disk mounting mechanism 100 of the present disclosure does not need to provide a independent heat conductive pad to each hard disk 300 when manufacturing the hard disk 300, which cuts the manufacturing cost of the hard disk 300. By assembling the hard disk 300 onto the slidable carrier 50 in a vertical direction relative to the slidable carrier 50, the hard disk mounting mechanism 100 of the present disclosure has decreased damage of the heat conductive pad caused by shearing strength of the traditional inserting assembling manner.

Although various features and elements are described as embodiments in particular combinations, each feature or element can be used alone or in other various combinations within the principles of the present disclosure to the full extent indicated by the broad general meaning of the terms in which the appended claims are expressed.

What is claimed is:

1. A hard disk mounting mechanism, for assembling a hard disk into a housing defining an opening, the hard disk being inserted into the housing via the opening, the hard disk mounting mechanism comprising:
   a mounting bracket comprising a cover rotatably connected to the housing for covering the opening;
   a slidable carrier located in the housing and adjacent to the opening, the slidable carrier having a first surface facing the opening; and
   a first heat conductive pad is arranged on the first surface of the slidable carrier, the hard disk assembled on the slidable carrier from the opening and contacting the first heat conductive pad.

2. The hard disk mounting mechanism of claim 1, wherein the cover comprises a cover body and a shielding plate coupled to the cover body, the cover body comprises an inner surface and an outer surface opposite to the inner surface, the second heat conductive pad is located on the inner surface and faces the slidable carrier, when the covered the opening, the second conductive pad contacts the hard disk assembled on the slidable carrier.

3. The hard disk mounting mechanism of claim 2, wherein a coupling protrusion is located on the shielding plate, a coupling hole is defined in the clip base, and the coupling protrusion is coupled to the coupling hole to prevent the cover rotating with respect to the housing.

4. The hard disk mounting mechanism of claim 1, wherein the mounting bracket further comprises a first slide rail and a second slide rail, the first slide rail and the second slide rail are located in the housing and adjacent to the opening and opposite to each other, and the slidable carrier is slidably located between the first slide rail and the second slide rail.

5. The hard disk mounting mechanism of claim 4, further comprising an electrical connector assembly located in the housing and adjacent to first ends of the first slide rail and the second slide rail, and the electrical connector assembly being electrically coupled with the hard disk.

6. The hard disk mounting mechanism of claim 5, wherein the electrical connector assembly comprises a mounting base, an enhancing plate, an electrical connector and a plurality of buffer pins, the mounting base is coupled with the first ends of the first slide rail and the second slide rail, the electrical connector is coupled with the enhancing plate, and the enhancing plate is coupled with the mounting plate by the buffer pins.

7. The hard disk mounting mechanism of claim 6, wherein a first flange is arranged on an outer surface of each buffer pins, the mounting plate is spaced to the enhancing plate by the first flange.

8. The hard disk mounting mechanism of claim 6, wherein at least one guiding post is located on the mounting base, at least one guiding hole corresponding to the guiding post is defined in the slidable carrier, at least one spring is located between the at least one guiding post and the at least one guiding hole to drive the slidable carrier moving away from the electrical connector assembly.

9. The hard disk mounting mechanism of claim 1, further comprising a clamping mechanism located on the hard disk to couple to the slidable carrier, at least one mounting hole is defined in the clamping mechanism, at least one mounting post corresponding to the at least one mounting hole is located on the slidable carrier, and the at least one mounting post is inserted into the at least one mounting hole to assemble the slidable carrier with the hard disk and the slidable carrier.

10. The hard disk mounting mechanism of claim 9, wherein the each mounting hole is provided with a guiding structure adjacent to the slidable carrier, the guiding structure is a sloped sidewall.

11. The hard disk mounting mechanism of claim 9, wherein the clamping mechanism comprises opposite clip arms, and a clip base connecting between the clip arms; the clip base and the clip arms cooperatively form a receiving space for receiving the hard disk.

12. The hard disk mounting mechanism of claim 11, wherein two tabs are respectively located on free ends of the clip base, when the clamping mechanism is assembled to the slidable carrier, the tabs engage with the second ends to lock the clamping mechanism to the housing.

13. The hard disk mounting mechanism of claim 11, wherein a plurality of buffer sleeves is located between the clip arm and the hard disk received in the receiving space.

14. The hard disk mounting mechanism of claim 13, wherein a second flange protrudes outwardly from an outer surface of buffer sleeve, the hard disk is spaced to the clip arms by the second flange of the buffer sleeve.

15. A hard disk mounting mechanism, for assembling a hard disk into a housing defining an opening, the hard disk being inserted into the housing via the opening, the hard disk mounting mechanism comprising:
   a mounting bracket comprising a cover rotatably connected to the housing for covering the opening; and
   a first heat conductive pad arranged in the housing and facing the opening, and the first heat conductive pad contacted with the hard disk when the hard disk is inserted into the housing from the opening.

16. The hard disk mounting mechanism of claim 15, wherein the cover comprises a cover body and a shielding plate coupled to the cover body, the cover body comprises an inner surface and an outer surface opposite to the inner surface, the second heat conductive pad is located on the inner surface and faces the slidable carrier, when the covered the opening, the second conductive pad contacts the hard disk assembled on the slidable carrier.

17. The hard disk mounting mechanism of claim 16, wherein a coupling protrusion is located on the shielding plate, a coupling hole is defined in the clip base, and the coupling protrusion is coupled to the coupling hole to prevent the cover rotating with respect to the housing.

18. The hard disk mounting mechanism of claim 15, wherein the mounting bracket further comprises a first slide rail and a second slide rail, the first slide rail and the second slide rail are located in the housing and adjacent to the opening and opposite to each other, and the slidable carrier is slidably located between the first slide rail and the second slide rail.

19. The hard disk mounting mechanism of claim 18, further comprising an electrical connector assembly coupled to the first slide rail and the second slide rail, and connected with the slidable carrier by a spring.

20. The hard disk mounting mechanism of claim 19, wherein the electrical connector assembly comprises a mounting base and a electrical connector located on the mounting base, at least one guiding post is located on the mounting base, at least one guiding hole corresponding to the guiding post is defined in the slidable carrier, and at least one spring is located between the at least one guiding post and the at least one guiding hole to drive the slidable carrier moving away from the electrical connector assembly.

* * * * *